Jan. 19, 1965    W. IMHOF    3,166,459
DEVICE FOR WELDING PLASTICS
Original Filed Aug. 7, 1959    2 Sheets-Sheet 1

WALTER IMHOF, INVENTOR, DECEASED
BY WALTRAUD IMHOF, ADMINISTRATRIX
BY Wenderoth, Lind
Ed Ponack
ATTORNEYS

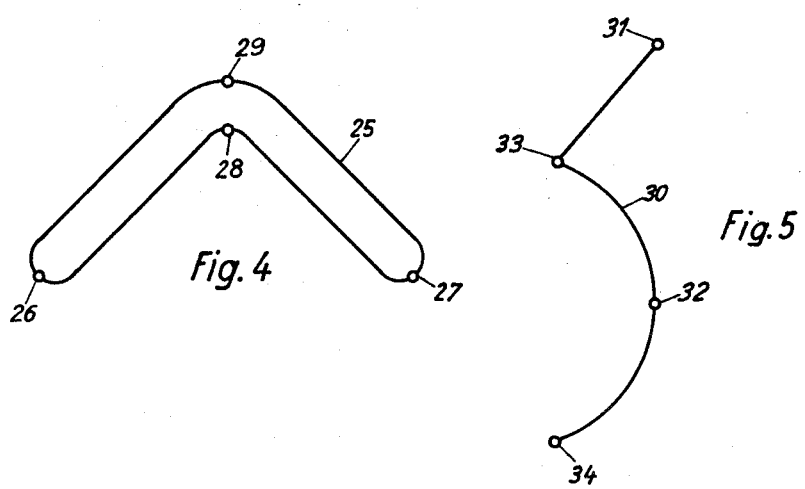
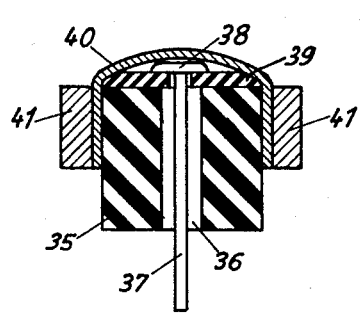
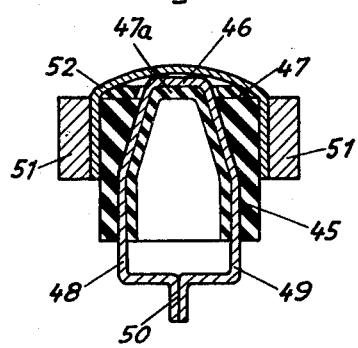

United States Patent Office ──

3,166,459
Patented Jan. 19, 1965

3,166,459
DEVICE FOR WELDING PLASTICS
Walter Imhof, deceased, late of Uster, Switzerland, by Waltraud Imhof, administratrix, Oberhochstadt, Taunus, Germany, assignor to Firma Gebr. Mägerle AG., Uster, Switzerland, a corporation of Switzerland
Original application Aug. 7, 1959, Ser. No. 832,395, now Patent No. 3,056,712, dated Oct. 2, 1962. Divided and this application Oct. 1, 1962, Ser. No. 231,053
Claims priority, application Switzerland, Aug. 9, 1958, 62,758
10 Claims. (Cl. 156—380)

The present invention relates to a device for welding plastics, in particular of welding plastic sheeting, along curved lines by use of the heat impulse process. The heat impulse process is a process in which a plastic material is pressed, at the spot to be welded, by members provided with an electrically heated heating conductor. The said heating conductors are heated during pressing by a short, strong impulse so that the plastic sheeting to be welded is heated to its plastic range. With these known processes it has so far been possible only to produce straight welding seams because the heating conductors must be mechanically prestressed owing to heat exchange. Nor has it so far been possible to weld closed shapes, such as circles, squares or ovals by means of an impulse because uniform heating of the two branches each absorbing one half of the current (heat conductor halves) has been practically impossible. In welding closed shapes it is, in particular, difficult to obtain perfect welding seams at the points of supply because excessive differences in heat generation occur owing to the variation in cross-section.

The apparatus according to this invention is distinguished from the apparatus known heretofore by the fact that the heat generating electric conductor is subdivided into at least two partially overlapping circuits and that switching devices stagger the current impulses supplied to the various circuits.

An embodiment of the apparatus and various details to illustrate the method are shown in the attached drawing, in which:

FIG. 4 is a variant of an angularly arranged closed heating conductor;

FIG. 5 is a variant of an open heating conductor for the obtention of a curved welding seam;

FIG. 6 is a cross-section taken through a branch or portion of a circular heating conductor means with the supply from underneath to the center, and FIG. 7 is a cross-section taken through a branch or portion of a circular heating conductor means with the supply from the outside and inside of the electric conductor.

Figure 1:
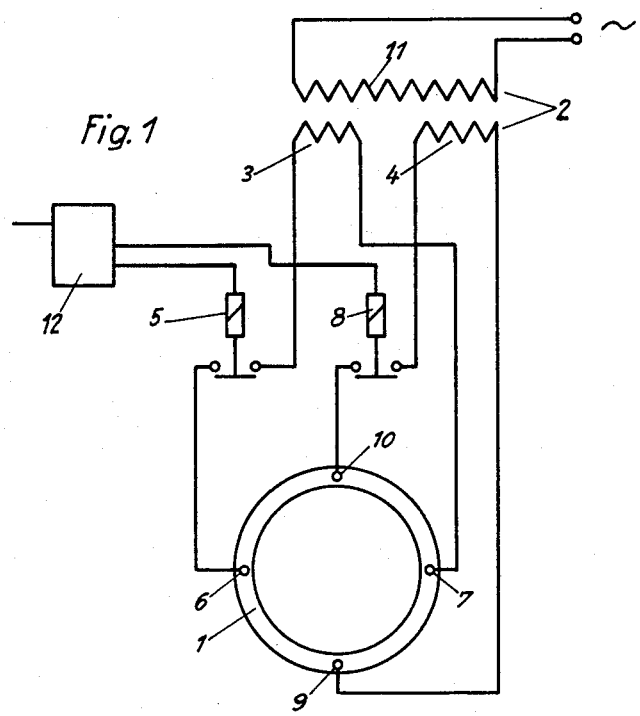
FIG. 1 is a diagram of a device for the obtention of a circular welding seam.

In FIG. 1, the reference numeral 1 designates a circular heating conductor by means of which plastic sheeting is welded together under pressure in the known manner. The numeral 2 designates a transformer provided with two secondary windings 3 and 4. The secondary winding 3 is connected to the contact points 6 and 7 of the circular heating conductor via a switching device 5, by way of example a relay. The secondary winding 4 is correspondingly connected to the contact points 9 and 10 of the heating conductor via a switching device 8. The numeral 11 designates the primary winding of the transformer 2. A switching unit 12 controls the two switch devices 5 and 8 in such a manner that the current impulses supplied to the two circuits are staggered in time. The switching unit 12 may, by way of example, be controlled from a part of the press which is not shown in FIG. 1. Again it is also possible to acauate the switching unit 12 manually by an operator.

Figure 2:
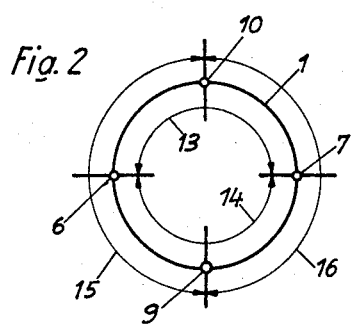
FIG. 2 is a diagram of the supply and distribution of the current impulses.

In FIG. 2 the heating conductor 1 is diagrammatically shown as a circle and the contacts 6, 7, 9 and 10 as small circles on the circumference of the heating conductor 1. The contacts 6 and 7 are arranged diametrically opposite each other. The contacts 9 and 10 are also arranged diametrically opposite each other and at an angle of 90° relative to the points 6 and 7. This arrangement produces two semi-circular conductors 13 and 14 starting from the contacts 6 and 7. On the circular conductor 1, the two semi-circular conductors 15 and 16 are formed from the contacts 9 and 10. The current impulses from the secondary windings 3 and 4 are distributed, in substantially equal parts, among the conductors 13 and 14 and, respectively, 15 and 16.

Figure 3:
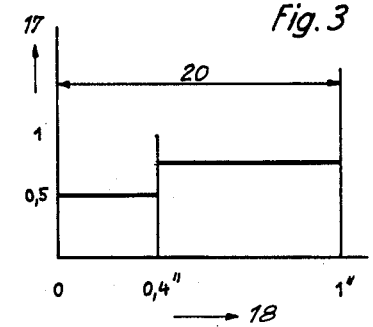
FIG. 3 is a diagrammatic view of a current impulse with a preceding stage for preheating the heating conductor.

The circuit of a device for the obtention of a circular welding seam according to FIGS. 1 and 2 may be modified or extended as desired. FIG. 3 shows a circuit of particularly advantageous design in which current impulses are supplied to the heating conductor with a stage arranged in front for preheating the said conductor. In the diagrammatic view according to FIG. 3, the heating current is plotted in amperes in the vertical direction (arrow 17). Plotted in the horizontal direction (arrow 18) is the welding time in seconds. The example according to FIG. 3 shows that a current of .5 amp. is applied for preheating the heating conductor 1 for a period of .4 second. Subsequently to this preheating time, the full heating current with about .75 amp. is supplied. The total welding time of about 1 second is indicated by the distance 20 in the diagram.

The embodiment according to FIGS. 1 and 2 operates as follows. In a press of known design, which is not represented in the drawing, a heating conductor 1 is arranged on one of the pressure exerting members of the press. When the plastic sheeting to be welded is engaged by the press, the switching unit 12 first actuates the switching device 5 in the known manner, which connects the secondary winding 3 of the transformer 2 to the heating conductor 1 at the two diametrically opposite contacts 6 and 7. The heating current is distributed among the two halves 13 and 14 of the heating conductor in about equal proportions. The switching device 5 interrupts the current impulse supplied to the secondary winding 3 after a short time. The plastic sheeting held under the heating conductor 1 has already been slightly welded. Immediately upon interruption of the heating current from the secondary winding 3, the switching device 8 supplies current from the secondary winding 4 to the contacts 9 and 10 of the heating conductor 1. Here, too, the current is distributed substantially equally between the two semi-circular parts 15 and 16 of the heating conductor 1. On the second impulse, any irregularities in the weld made by the contacts 6 and 7 are evened and corrected so that an uninterrupted and tight circular welding seam is produced. By means of such a welding seam, a circular bottom may be welded to a cylindrical container formed of plastic sheeting. Any unsatisfactory weld of the contacts 9 and 10 is corrected because the first current impulse has already formed the welding seam at these points. The switching unit 12 interrupts the second current impulse from the secondary winding 4 by means of the switching device 8, whereupon the press is again opened and the completely welded work can be removed from the press. As described above, the current impulse employed for welding may, according to the diagram in FIG. 3, be preceded by a current impulse of lesser amperage for preheating the heating conductors. The number of current impulses may be increased if this is necessary for technical reasons. The switching 12 is so designed that a current impulse of longer duration and smaller intensity than that employed for welding is supplied to the heating conductors for preheating.

The same process may be applied for the obtention of shaped welds in plastic sheeting. With an angularly disposed closed heating conductor 25 according to FIG. 4, the contacts 26 and 27 are arranged at the ends of the arms of the angle. Further contacts 28 and 29 are advantageously arranged at the center of the angle.

The apparatus according to this invention may also be used with open heating conductors 30 (FIG. 5). The supply to such a heating conductor is effected via the points 31 and 32 with a first current impulse and via the contacts 33 and 34 with a second current impulse. It should be noted that the open ends of the heating conductor are supplied with a smaller voltage in order to avoid overheating the plastic material. With elongated open conductors, the order of impulses must be provided from the center towards the outside so that the cooling and heat elongation of the heating conductor can operate as required.

Since the heating conductors cannot be prestressed when using this apparatus, measures must be taken to compensate for heat elongations of the heating conductor. In FIG. 6, a frame or block 35 is arranged as a support which exercises the pressure. A current connection 37 to the electric lead 38, which is at the same time designed as a heat conductor, is introduced to the center of the heating conductor through bores 36. The heating conductor is resiliently arranged so as to float on an elastic support 39. A protective covering 40 formed of heat resistant elastic material is held by clamps 41. This design is particularly recommended for heat conductors of less than 2 mm. width. For heat conductors having a width exceeding 5 mm., the current connections are advantageously designed in accordance with FIG. 7. In FIG. 7 the reference numeral 45 designates a support or block which at the same time serves to exercise the pressure. The heating conductor 46 is arranged so as to float on an elastic support 47 and 47a. Current connection to the heating conductor is effected from below to the outside and inside of the heating conductor by the two tongues 48 and 49. At 50 the two tongues 48 and 49 connect to form the cable connection to the secondary winding of the transformer. Clamps 51 hold a protective covering 52 formed of a heat resistant elastic material on the support 45. It is to be appreciated that in the embodiments of FIGURES 6 and 7 the blocks 35 and 45, respectively, may advantageously be formed of a suitable electrical insulating material. Moreover, in the illustrated embodiments of these figures, the protective covering members 40 and 52, respectively, are formed of a heat resistant elastic material which is non-conductive, but under certain conditions of use may however also conceivably be formed of an electrically conductive material.

The use of the apparatus according to the present invention enables plastic sheeting to be welded together along curved lines, by way of example along a circular line, which has previously not been possible by means of the known apparatuses. The occurrence of cold areas where no weld can be obtained is eliminated by the present method. The resilient arrangement of the heating conductor prevents its deformation and thus a deviation of the welding seam from the line or shape desired. A further advantage of this apparatus resides in the fact that substantially thicker heating conductors may be employed. With these cross-sections the heating conductor can be given any desired section.

This application is a division of application Serial No. 832,395, filed August 7, 1959, now U.S. Patent No. 3,056,712, and granted October 2, 1962.

What is claimed is:

1. An apparatus for welding plastic, particularly along curved lines, comprising a welding member adapted to contact the plastic to be welded and including as a part thereof an electrical conductor having at least four contacts spaced along the length thereof, at least two circuits having means therein for applying power thereto and connected to said contacts such that a least a part of said electrical conductor is common to both circuits, and switching means in said circuits for energizing first one circuit and then the other circuit while the one circuit is deenergized.

2. An apparatus as claimed in claim 1 in which said welding member is in the shape of a closed figure and said electrical conductor is a wire in the shape of a closed figure and the number of contacts thereon is four, said contacts being equally spaced along the wire, there being two said circuits, one circuit being connected to diametrically opposite contacts and the other circuit being connected to the remaining contacts.

3. An apparatus as claimed in claim 2 in which said closed figure is a circle.

4. An apparatus as claimed in claim 2 in which said closed figure has an irregular shape.

5. An apparatus as claimed in claim 1 in which said electrical conductor has a substantially flat surface for engagement against the plastic to be welded, said contacts being connected to the side of said electrical conductor opposite to said flat surface, said contacts each comprising a conducting lead secured to said electrical conductor, and said welding member further includes an insulating block around said lead, a resilient backing between said insulating block and said electrical conductor through which said conducting lead extends, a protective covering over the flat surface of said electrical conductor, and means for engaging and securing said protective covering to said insulating block.

6. An apparatus as claimed in claim 5; wherein said welding member with said electrical conductor is in the shape of a closed figure which is circular, said conducting lead for each contact being operatively connected at approximately the center of said electrical conductor at said side opposite to said flat surface.

7. An apparatus as claimed in claim 5; wherein said welding member with said electrical conductor is in the shape of a closed figure which is circular, said conducting lead for each contact being operatively connected to opposed edges of said circular electrical conductor at the inside and outside thereof.

8. An apparatus as claimed in claim 5; wherein said electrical conductor is floatingly mounted at said insulating block.

9. Apparatus for welding plastic, particularly along curved lines, comprising a welding member adapted to contact the plastic to be welded and including as a part thereof heat generating means provided with at least four points of supply for electric energy, a first circuit electrically coupled to two of said points of supply and a second circuit electrically coupled to the remaining points of supply, said points of supply coupled with each circuit being disposed on said heat generating means to provide at least two partially overlapping circuits through said heat generating means, means for supplying electric energy to said first and second circuits, and means operatively connected to said first and second circuits for selectively energizing first one circuit and its associated overlapping circuit through said heat generating means and then the other circuit and its associated overlapping circuit through said heat generating means while deenergizing said one circuit.

10. Apparatus for welding plastic as defined in claim 9 in which said welding member and said heat generating means are in the shape of a closed figure and said points of supply number four, said respective two points of supply coupled with each of said first and second circuits, respectively, each being arranged at separate diametrically opposed locations on said heat generating means.

References Cited by the Examiner

UNITED STATES PATENTS

| | | | |
|---|---|---|---|
| 1,236,091 | 8/17 | Kicklighter | 219—116 |
| 1,282,330 | 10/18 | Van Aller | 219—552 |
| 1,988,845 | 1/35 | Jewett | 219—508 |
| 2,623,149 | 12/52 | Amar | 175—16 |
| 2,902,573 | 9/59 | Gayer | 219—383 |
| 3,112,586 | 12/63 | Luetzow | 156—583 |

FOREIGN PATENTS 163,916   7/58   Sweden.

RICHARD M. WOOD, *Primary Examiner*.